2 Sheets—Sheet 1.

T. V. LE ROY,

Assignor to THE LE ROY JOURNAL BEARING COMPANY.

CAR AXLE BOX.

No. 9,842. Reissued Aug. 16, 1881.

WITNESSES

F. M. Burnham

INVENTOR

T. V. Le Roy by Charles S. Whitman

ATTORNEY

THE NORRIS PETERS CO., WASHINGTON, D. C.

2 Sheets—Sheet 2.

T. V. LE ROY,

Assignor to THE LE ROY JOURNAL BEARING COMPANY.

CAR AXLE BOX.

No. 9,842. Reissued Aug. 16, 1881.

WITNESSES

F. M. Burnham

[illegible]

T. V. Le Roy INVENTOR

Charles S. Whitman

ATTORNEYS.

THE NORRIS PETERS CO., WASHINGTON, D. C.

UNITED STATES PATENT OFFICE.

TENNIS V. LE ROY, OF UTICA, ASSIGNOR TO THE LE ROY JOURNAL BEARING COMPANY, OF NEW YORK, N. Y.

CAR-AXLE BOX.

SPECIFICATION forming part of Reissued Letters Patent No. 9,842, dated August 16, 1881.

Original No. 221,737, dated November 18, 1879. Reissue No. 9,084, dated February 17, 1880. Application for reissue filed June 28, 1881.

DIVISION B.

*To all whom it may concern:*

Be it known that I, TENNIS V. LE ROY, of Utica, in the county of Oneida and State of New York, have invented certain new and useful Improvements in Car-Axle Boxes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to car-axle boxes and to the brasses, bearings, or collars in which journals or gudgeons rotate; and the nature of my invention consists in providing the said brasses or bearings with a series of apertures for the reception of a soft-metal filling projecting above and below the said brasses.

It also consists in a socket or casing provided with nicks and flanges to guide and hold the bearings in position.

It also consists in arranging upon the upper side of the brass and adjacent to the casing projections of soft metal, which fill up the uneven parts of the socket, and thus adjust the brass accurately within the said casing.

Figure 1:
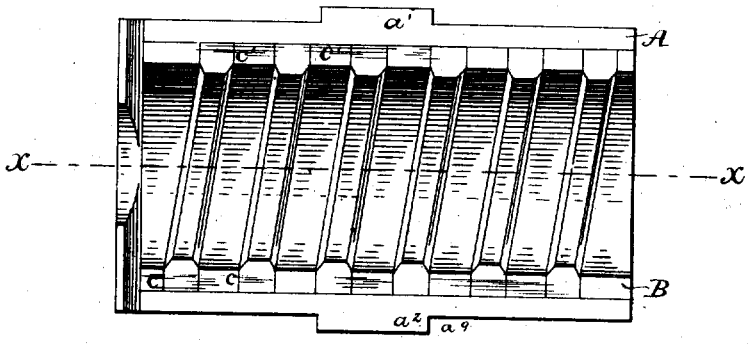
Figure 2:
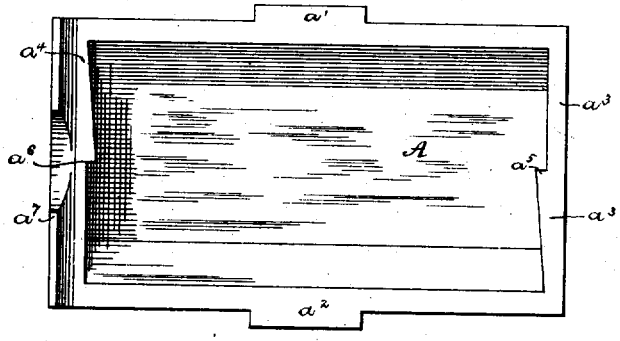
Figure 3:
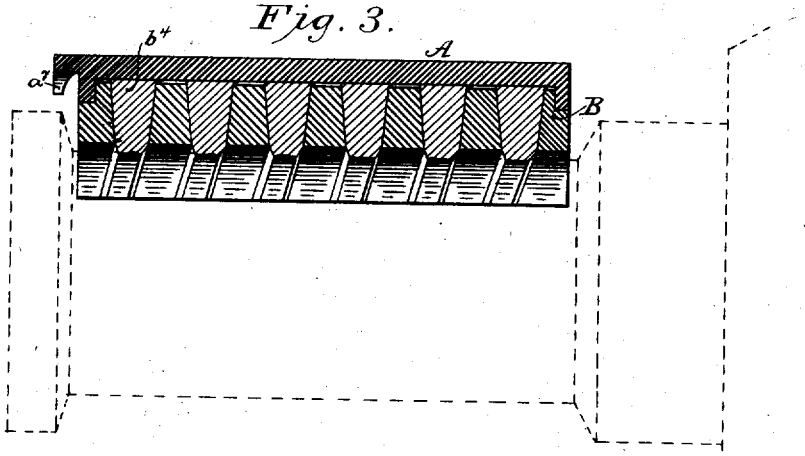
Figure 4:
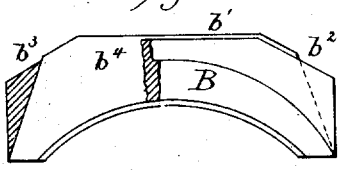
Figure 5:
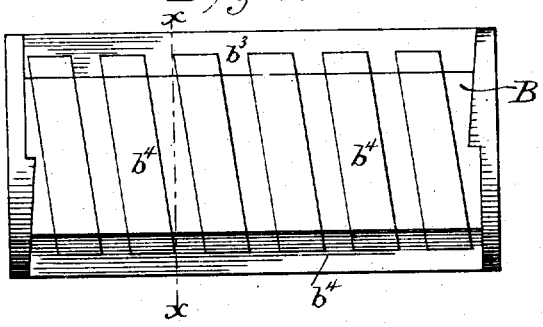
Figure 6:
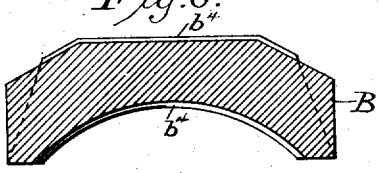

In the accompanying drawings, in which similar letters indicate like parts, Figure 1 represents the side of the brass against which the journal of the axle rotates arranged within its casing. Fig. 2 illustrates the casing with the brass removed therefrom. Fig. 3 is a longitudinal vertical section taken on the line $x\ x$, Fig. 1, and is an illustration of the position of the bearing with reference to the journal of the axle or shaft. Fig. 4 is a view, partially in section, illustrating the end of the bearing and the position of the soft-metal spirals. Fig. 5 is a plan view of the top of the brass. Fig. 6 is a transverse section taken on the line $x\ x$, Fig. 5.

The casing is provided with a socket, A, of a proper size and form to receive the brass B and flanges $a'$, $a^2$, $a^3$, and $a^4$, the two latter of which have curvilinear edges, in order that they may conform to the shape of the journal and nicks $a^6$ and $a^5$, which fit corresponding notches formed upon the brass, for the purpose of guiding the said brass to its proper seat and holding it in position when seated. On the outside of the casing are projections which permit the same to occupy its proper position in the box or housing. The latter is not shown in the drawings, but may be of any form or size which I may prefer to use. The casing is also provided with a notched projection, $a^7$, for convenience in handling.

The top of the brass B is shown as formed by intersecting plane surfaces $b'$, $b^2$, and $b^3$; but it may be of any other shape which may be preferred and to which my invention is applicable, and the shape of the socket A may be made to conform to the form of the brass. The hard-metal part of the brass may be composed of any suitable material which is sufficiently tough and hard to present a proper wearing-surface to the journal of the car-axle, and the soft filling may be constructed of any pliant metal or metallic compound which readily yields to pressure and is sufficiently flexible to permit the journal of the axle to adjust itself therein.

When it is desired that the soft metal shall project from the hard-metal bearing-surface, and also form a cushion between the top of the brass and the casing, the brass is constructed of alternate sections of hard and soft metal by providing it with a series of spiral apertures passing entirely through from the bearing-surface to the surface adjacent to the casing and filling up these apertures with soft metal, as seen at $b^4$, in such a manner as to form a series of segmental spiral projections, against which the journal of the axle rotates, and another series of soft-metal spirals between the upper side of the brass and the casing. The soft-metal bands project sufficiently from the hard metal to expand and adjust the bearing and wearing surface to the journal of the axle.

Having thus described my invention, I claim and desire to secure by Letters Patent of the United States—

1. A bearing constructed of alternate ribs of hard and soft metal, the soft-metal projecting above and below the hard metal, as and for the purposes described.

2. A socket or casing provided with nicks and flanges to guide and hold the bearing in position.

3. A series of projections of soft metal on the upper side of the brass and adjacent to the casing, as and for the purposes described.

In testimony that I claim the foregoing I have hereunto set my hand this 20th day of June, 1881.

T. V. LE ROY.

Witnesses:
L. C. WACHNER,
D. C. BIRDSALL.